(12) United States Patent
Cho et al.

(10) Patent No.: US 7,477,335 B2
(45) Date of Patent: Jan. 13, 2009

(54) LIQUID CRYSTAL DISPLAY DEVICE AND FABRICATION METHOD THEREOF

(75) Inventors: So Haeng Cho, Seoul (KR); Min-Joo Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 135 days.

(21) Appl. No.: 11/004,100

(22) Filed: Dec. 6, 2004

(65) Prior Publication Data

US 2005/0094049 A1    May 5, 2005

Related U.S. Application Data

(62) Division of application No. 10/601,784, filed on Jun. 24, 2003, now Pat. No. 6,930,733.

(30) Foreign Application Priority Data

Dec. 27, 2002    (KR)    ................ 2002-85625

(51) Int. Cl.
G02F 1/136    (2006.01)
(52) U.S. Cl. ........................................ 349/43
(58) Field of Classification Search ............... 349/43
See application file for complete search history.

(56) References Cited

U.S. PATENT DOCUMENTS 4,294,650 A * 10/1981 Werthmann ................ 216/54
5,243,202 A * 9/1993 Mori et al. .................. 257/59
5,251,049 A * 10/1993 Sato et al. ................... 349/43
5,259,926 A * 11/1993 Kuwabara et al. .......... 216/54
5,355,235 A * 10/1994 Nishizawa et al. .......... 349/43
5,514,503 A * 5/1996 Evans et al. ................. 430/7
5,544,582 A * 8/1996 Bocko et al. .............. 101/211
5,678,483 A * 10/1997 Johnson .................... 101/153
5,701,815 A * 12/1997 Bocko et al. .............. 101/211
5,731,855 A * 3/1998 Koyama et al. ............. 349/43
5,886,761 A * 3/1999 Sasaki et al. .............. 349/122
5,926,235 A * 7/1999 Han et al. ................... 349/43
6,001,515 A * 12/1999 Evans et al. ................. 430/7
6,356,318 B1 * 3/2002 Kawahata ................... 349/38

FOREIGN PATENT DOCUMENTS

EP    0 471 628 A1 *  2/1992
JP    63-205608      *  8/1988
JP    4-94115        *  3/1992
JP    5-11270        *  1/1993

* cited by examiner

Primary Examiner—James A Dudek
(74) Attorney, Agent, or Firm—McKenna Long & Aldridge, LLP

(57)    ABSTRACT

A method for fabricating a liquid crystal display device comprises: providing a transparent substrate; forming a gate electrode and a gate line on the substrate; forming a semiconductor layer pattern on the gate electrode; forming source/drain electrode and a data line vertically intersecting the gate line and defining a pixel region; and forming a striped passivation layer on the data line and on the thin film transistor.

4 Claims, 7 Drawing Sheets

LIQUID CRYSTAL DISPLAY DEVICE AND FABRICATION METHOD THEREOF

This application is a divisional of prior application Ser. No. 10/601,784, filed Jun. 24, 2003, now U.S. Pat. No. 6,930,783 which claims priority to Korean Patent Application No. 2002-85625, filed on Dec. 27, 2002, each of which are incorporated by reference for all purposes as if fully set forth herein.

This application claims the benefit of Korean Patent Application No. 2002-85625, filed on Dec. 27, 2002, which is hereby incorporated by reference for all purposes as if fully set forth herein.

BACKGROUND OF THE INVENTION

1. Field of the Invention

The present invention relates to a liquid crystal display device and its fabrication method, and more particularly, to a liquid crystal display device with a passivation layer favorable for a printing method and its fabrication method.

2. Discussion of the Related Art

A display device, especially, a flat panel display device such as a liquid crystal display device, has an active device, such as a thin film transistor, in each pixel to drive the pixel. This kind of driving method of the display device is usually called an active matrix driving method. In such an active matrix method, the active device to drive the pixel is disposed at pixel regions arranged in a matrix form.

FIG. 1 is a view illustrating an active matrix liquid crystal display device. The liquid crystal display device in this figure is a TFT-LCD (Thin Film Transistor Liquid Crystal Display) employing thin film transistors as the active devices.

As illustrated in FIG. 1, perpendicularly arranged gate lines 2 and data lines 4 define pixel regions. A thin film transistor 10 is formed at the crossing point of the gate line 2 and the data line 4 to independently control driving of each pixel region. The thin film transistor 10 includes a gate electrode 2a connected to the gate line 2, a semiconductor layer 5 formed on the gate electrode 2a and activated when a scan signal is applied to the gate electrode 2a, and source/drain electrodes 4a and 4b formed on the semiconductor layer 5a.

A pixel electrode 7 is formed at the pixel region and connected to the drain electrode 4b. When an image signal is applied to the pixel electrode 7 through the source and drain electrode 4a and 4b as the semiconductor 4 is activated, an image signal is applied to the pixel electrode 7 through the source/drain electrodes 4a and 4b to operate liquid crystal (not shown). The pixel electrode 7 is connected to the drain electrode 4b through a drain contact hole 8a.

A storage electrode 6 is independently formed on the gate line 2, and a gate insulation film (not shown) is interposed between the gate line 2 and the storage electrode 6. The gate line 2 overlapping with the storage electrode 6 forms a storage capacitor Cst with the gate insulation film formed between the storage electrode 6 and the gate line 2, and the storage electrode 6 is connected to the pixel electrode 7 through the storage contact hole 8b.

The storage capacitor Cst charges a gate voltage while a gate signal is applied to the gate electrode 2a and discharges the charged voltage while a data voltage is supplied to the pixel electrode 7 when the next gate line is driven, thereby preventing voltage change in the pixel electrode 7.

FIG. 2 illustrates a structure of a section taken along line I-I' of FIG. 1 of the thin film transistor 10 and the storage capacitor Cst disposed in the pixel.

As illustrated, the thin film transistor 10 includes a substrate 1 made of a transparent insulation material such as glass; a gate electrode 2a formed on the substrate 1; a gate insulation layer 13 deposited over the entire substrate 1 with the gate electrode 2a formed thereon; a semiconductor layer 5a formed on the gate insulation layer 13 and activated as a signal is applied to the gate electrode 2a, an ohmic contact layer 5b formed on the semiconductor layer 5a, source/drain electrodes 4a and 4b formed on the ohmic contact layer 5b, and a passivation layer 15 formed on the source/drain electrode 4a and 4b to protect the TFT, on which a pixel electrode 7 is formed connected to the drain electrode 4b through the drain contact hole 8a. The source/drain electrodes 4a and 4b are electrically connected to the pixel electrode 7 formed in the pixel region, so that as a signal is applied to the pixel electrode 7 through the source/drain electrodes 4a and 4b, liquid crystal in the pixel region is driven to display an image.

Meanwhile, the storage capacitor Cst consists of the gate line 2, the storage electrode 6 and the gate insulation film 13 formed therebetween.

The passivation layer 15 is formed over the entire surface of the substrate 1 including the thin film transistor 10 and the storage electrode 6. Contact holes 8a and 8b are formed in the passivation layer 15 to expose portions of the drain electrode 4b and the storage electrode 6. The drain electrode 4b and the storage electrode 6 are electrically connected to the pixel electrode 7 through the contact holes 8a and 8b.

The liquid crystal display device constructed as described above has the following problems.

That is, the liquid crystal display device is fabricated by a photomasking process including a series of photoresist deposition, alignment, exposure, development and cleansing. Also, plural photomasking processes are necessary to complete the liquid crystal display device, thus degrading a productivity.

In addition, in forming the contact hole of the passivation layer, after the photoresist is exposed, the photoresist is not completely removed during the developing process. The residual photoresist film causes an increase in contact resistance between the drain electrode and the storage electrode that are electrically connected to the pixel electrode, degrading a picture quality.

SUMMARY OF THE INVENTION

Accordingly, the present invention is directed to a liquid crystal display device and fabrication method thereof that substantially obviates one or more of the problems due to limitations and disadvantages of the related art.

Therefore, an advantage of the present invention is to provide a method for fabricating a liquid crystal display device including a printing method.

Another advantage of the present invention is to provide a liquid crystal display device with a passivation layer favorable for a printing method.

To achieve these and other advantages and in accordance with the purpose of the present invention, as embodied and broadly described herein, there is provided a method for fabricating a liquid crystal display device including: providing a first substrate; forming a gate electrode and a gate line on the first substrate; forming a semiconductor layer pattern on the gate electrode; forming source/drain electrode and a data line substantially perpendicular to the gate line and crossing to define a pixel region; forming a striped passivation layer on the data line and on the thin film transistor; providing a second substrate facing the first substrate; and providing liquid crystal between the first and substrate In another aspect, a liquid crystal display device includes first and second substrates facing each other; a gate line and a data line arranged substantially perpendicular to one another on the first substrate and defining a pixel region; a thin film transistor at crossing of the gate line and the data line; a passivation layer in a stripe form on the data line and the thin film transistor; and liquid crystal between the first and second substrates. In another aspect of the present invention, a method of fabricating a liquid crystal display device includes providing a first substrate; forming a gate electrode and a gate line on the substrate; forming a semiconductor layer pattern on the gate electrode; forming source/drain electrode and a data line substantially perpendicular to the gate line and crossing the gate line to define a pixel region; forming a passivation layer on the data line and on the thin film transistor by roll printing an organic material onto the first substrate; providing a second substrate facing the first substrate; and providing liquid crystal between the first and second substrate.

The foregoing and other features, aspects and advantages of the present invention will become more apparent from the following detailed description of the present invention when taken in conjunction with the accompanying drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to the preferred embodiments of the present invention, examples of which are illustrated in the accompanying drawings.

Figure 1:
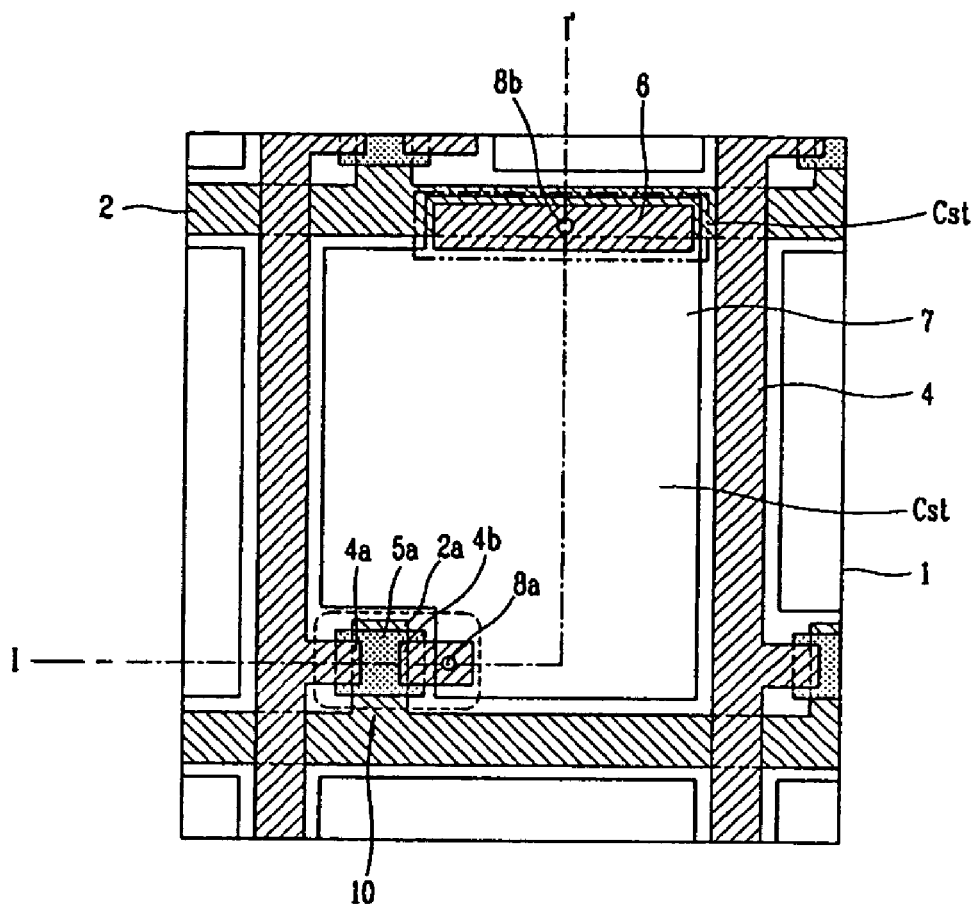
FIG. 1 is a plane view illustrating a structure of a general liquid crystal display device.
Figure 2:
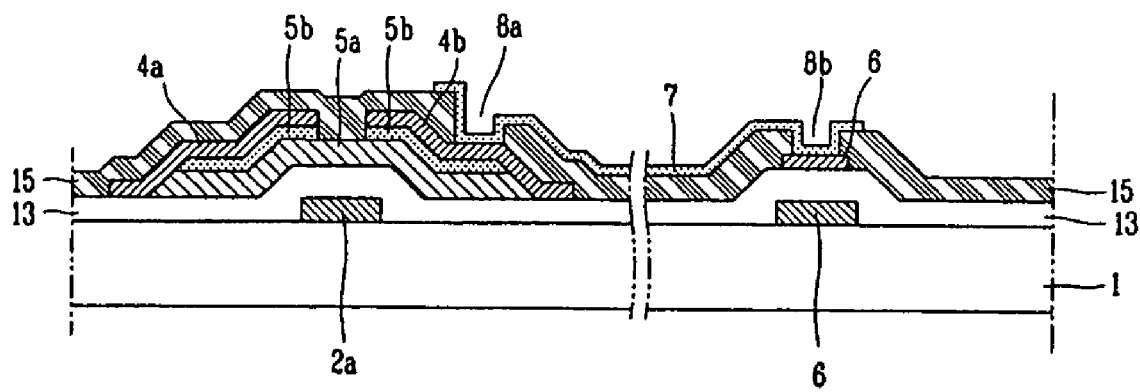
FIG. 2 is a sectional view taken along line I-I' of FIG. 1.
Figure 3A:
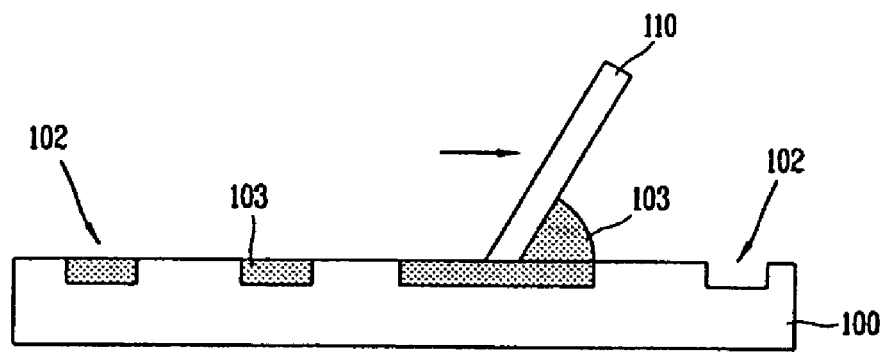
FIGS. 3A to 3C are views illustrating a pattern forming method of a liquid crystal display device by a printing method in accordance with the present invention.
Figure 3B:
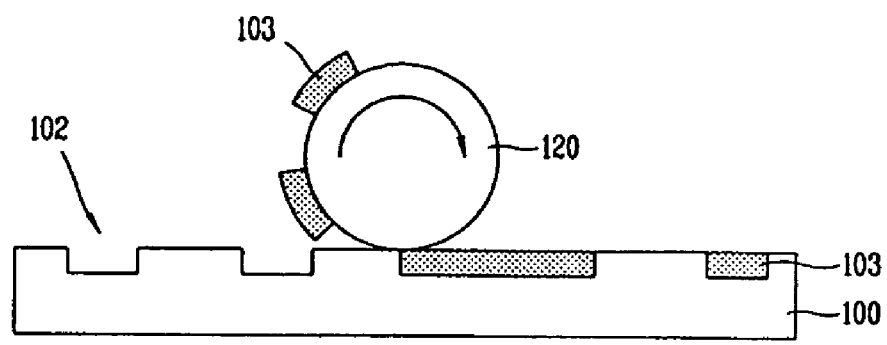
Figure 3C:
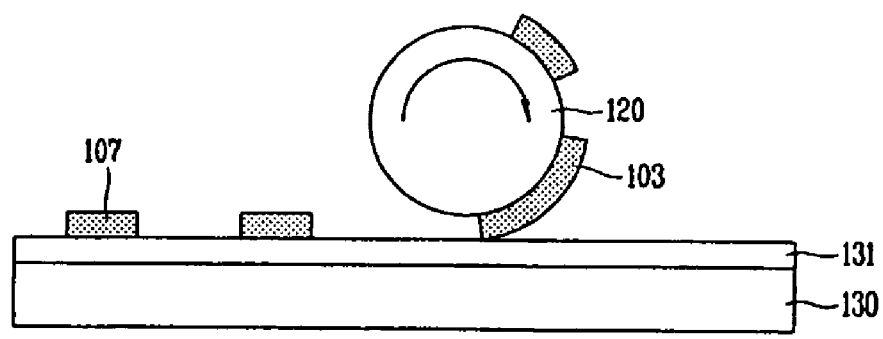

FIGS. 3A to 3C are views illustrating a resist pattern forming method of a liquid crystal display device through a printing method in accordance with the present invention.

With reference to FIG. 3A, a cliché 100 with a concave groove 102 formed at a position corresponding to a pattern desired to be formed on a substrate is prepared. A resist 103 is deposited on the surface of the substrate 100. A doctor blade 110 may be used to planarize the surface of the cliché 100, push the resist into the grooves 102 and remove the resist 103 from the surface of the cliché 100. Thus, the resist 103 is filled in the groove 102 while the resist remaining on the surface of the cliché 100 is removed.

As illustrated in FIG. 3B, the resist 103 filled in the groove 102 of the cliché 100 is transferred to a surface of the printing roll 120 that is rotated in contact with the surface of the cliché 100. The printing roll 110 is formed with the same width as a panel of a display device to be fabricated and has a circumference substantially the same as the length of the panel. Accordingly, the resist 103 filled in the groove 102 of the cliché 100 is transferred onto the printing roll 120.

Thereafter, as illustrated in FIG. 3C, to transfer the resist 103 on the printing roll 120 to the surface of the etching object layer 131 formed on the substrate 130, the printing roll 120 is rotated in close proximity or in contact with the etching object layer 131. Thus, the resist 103 transferred on the printing roll 120 is applied to the etching object layer 131. Then, the applied resist is UV-irradiated or heated to be dried to form a resist pattern 107. Accordingly, at this time, a desired resist pattern 107 can be formed over the entire etching object layer 131 by rotating the printing roll 120 once over the surface of the etching object layer 131.

The etching object layer 131 can be a metal layer for forming a metal pattern such as the gate electrode or the source/drain electrodes of the thin film transistor, the gate line, the data line or the pixel electrode and the storage electrode, or the semiconductor layer. The etching object layer 131 can be the insulation layer such as SiOx or SiNx, or any other type of material desired to be patterned using a resist.

After the resist pattern 107 is formed on the etching object layer 131 such as the metal layer or the insulation layer, the etching object layer is etched through a general etching process, thereby forming a desired patterned layer. That is, in the case of a metal layer, e.g., the gate line, the data line and the electrode structure of the thin film transistor or in the case of the insulation layer, e.g., a contact hole, etc. or desired pattern.

The above-described printing method is advantageous in that the resist pattern can be generated through a one time process. The process is simple, and process time can be shortened compared to the related photomasking process.

However, with such a printing method, a defective pattern may be created in forming a fine pattern (on the order of microns), such as the contact hole. That is, as mentioned above with respect to the related art, the contact hole is formed at the upper portion of the thin film transistor, exposing a portion of the drain electrode and the storage electrode of the thin film transistor, and the pixel electrode formed on the passivation layer is electrically connected with the drain electrode and the storage electrode through the contact hole. However, since the contact hole has a size of few μm, it is difficult to form an accurate pattern.

Figure 4:
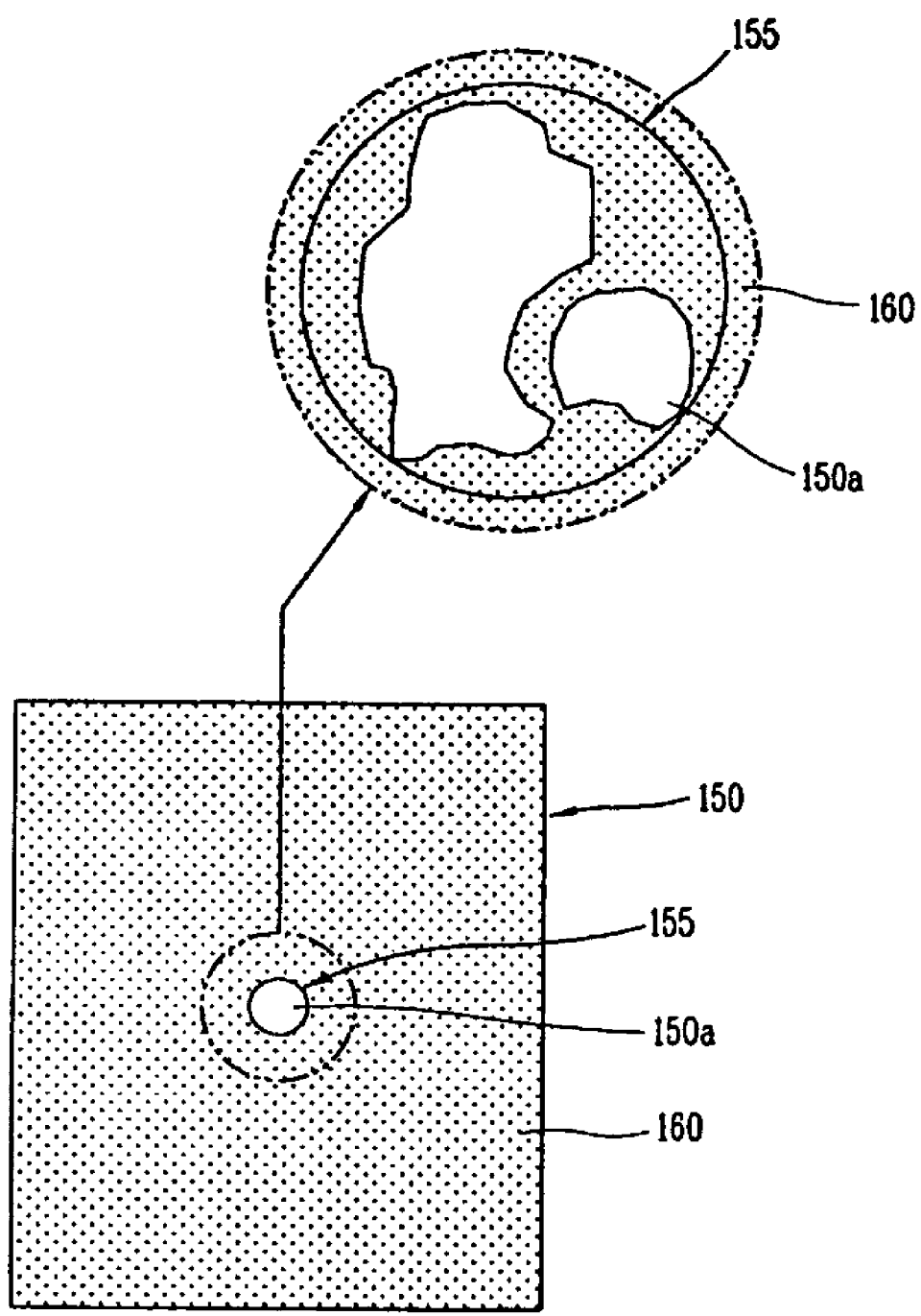
FIG. 4 is a plan view illustrating a defective contact hole as possibly formed in case that an etching object layer is a passivation layer.

In order to form the contact hole, as illustrated in FIG. 4, a resist 160 should be formed on the passivation layer 150 except for the contact hole region 155. Using the resist 160 as a mask, the exposed passivation layer 150a is etched to form a contact hole. In accordance with the present invention, the resist 160 is formed simultaneously when the printing roll (not shown) is rotated on the passivation layer. The printing roll may apply some pressure to the passivation layer. However, in case of a fine pattern such as the contact hole, the pressure applied causes some of the resist 160 to spread into the contact hole region 155, as illustrated in the enlarged view. In the worst case, the contact hole region 155 may be filled with some of the resist 160.

With the contact hole pattern poorly formed, the passivation layer cannot be properly etched. Then, the pixel electrode may not properly contact with the drain electrode and the storage electrode, causing an increase in the contact resistance, resulting in a problem in driving of the thin film transistor and degradation of a picture quality.

Therefore, the present invention aims to provide a liquid crystal display device with a passivation layer structure favored for the printing method.

Figure 5A:
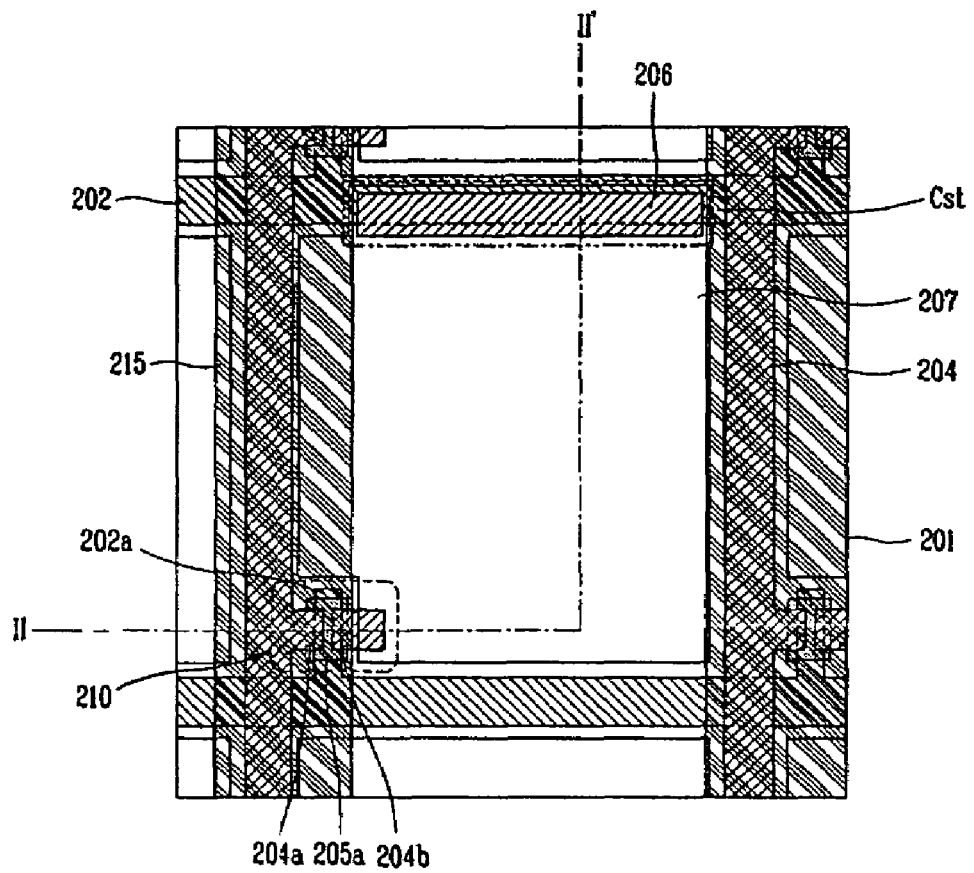
FIGS. 5A and 5B are a plan view and illustrate a sectional structure taken along line II-II' of FIG. 5A of a thin film transistor and a storage capacitor disposed in a pixel of a liquid crystal display device in accordance with a first embodiment of the present invention.
Figure 5B:
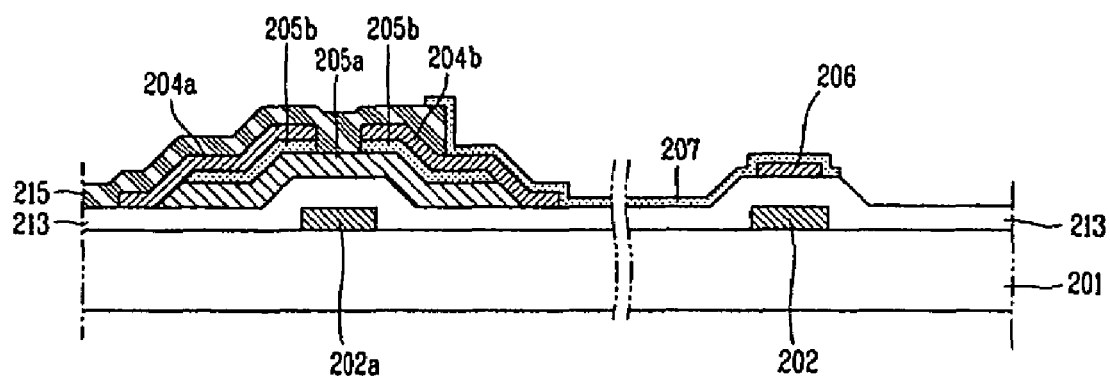

FIG. 5A is a plan view and FIG. 5B is a sectional view taken along line II-II' of FIG. 5A of a thin film transistor and a storage capacitor in a pixel of a liquid crystal display device in accordance with a first embodiment of the present invention.

As illustrated, in the liquid crystal display device in accordance with the present invention, the gate line 202 and data line 204, which are substantially perpendicular to one another on a substrate, define the pixel region. A thin film transistor 210 is formed near the crossing of the gate line 202 and the data line 204 to independently control driving of each pixel.

The thin film transistor 210 includes a gate electrode 202a connected to the gate line 202, a semiconductor layer 205a formed on the gate electrode 202a and activated when a scan signal is applied to the gate electrode 202a, an ohmic contact layer 205b formed on the semiconductor layer 205a and source/drain electrodes 204a and 204b formed on the ohmic contact layer 205b.

A pixel electrode 207 is formed at the pixel region and connected to the source/drain electrodes 204a and 204b. When the semiconductor layer 205 is activated, an image signal is applied to the pixel electrode 207 through the source/drain electrodes 204a and 204b to operate liquid crystal (not shown). The pixel electrode 207 may be directly connected to the drain electrode 204b.

A passivation layer 215 is formed in a stripe on the thin film transistor 210 and on and along the data line 204. The passivation layer 215 protects the thin film transistor 210 and prevents a short between the data line 204 and its adjacent pixel electrode 207.

In the pixel region defined by the gate line 202 and the data line 204, the storage electrode 206 disposed on the gate line 202 and a portion of the drain electrode 204b on which the pixel electrode is formed are exposed. That is, these features are not covered by the passivation layer 215.

Accordingly, the drain electrode 204b and the storage electrode 206 can contact the pixel electrode 207 directly without the need for a contact hole through the passivation layer. The storage electrode 206 forms the storage capacitor Cst together with the gate line 202 formed at its lower side.

With reference to FIG. 5B, the thin film transistor 210 includes a substrate 201 made of a transparent insulation material such as glass, a gate electrode 202a formed on the substrate 201, a gate insulation layer 213 deposited over the entire substrate 201 with the gate electrode 202 formed thereon, a semiconductor layer 205a formed on the gate insulation layer 213 and activated when a signal is applied to the gate electrode 202a, an ohmic contact layer 205a formed on the semiconductor layer 205a, source/drain electrode 204a and 204b formed on the ohmic contact layer 205b. The passivation layer 215 for protecting the thin film transistor device is formed over the source/drain electrode 204a and 204b. As mentioned above with reference to FIG. 5, the passivation film 215 is formed only on an upper portion of the thin film transistor on part of the drain electrode 204b, leaving a portion of the drain electrode exposed. The exposed portion of the drain electrode 204b and the storage electrode 206 directly contact with the pixel 204b electrode 207 formed thereon.

The source/drain electrodes 204a and 204b of the thin film transistor 210 are electrically connected to the pixel electrode 207 formed in the pixel, so that as a signal is applied to the pixel electrode 207 through the source/drain electrodes 204a and 204b, liquid crystal is driven to display an image.

The storage capacitor Cst consists of the gate line 202, the storage electrode 206, and the gate insulation layer 213 formed therebetween. The storage capacitor Cst charges a gate voltage while a gate signal is applied to the gate electrode 202a and discharges the charged voltage while a data voltage is supplied to the pixel electrode 207 when the next gate line is driven, thereby preventing a voltage change of the pixel electrode 207.

The liquid crystal display device with the above-described structure is fabricated through the following process, which will now be described with reference to FIG. 5B.

First, a metal material such as Al, AlNd, Cr, Mo, and/or Cu is deposited on the transparent substrate 201 by sputtering and patterned to form the gate electrode 202a and the gate line 202.

Next, an inorganic film such as SiNx or SiOx is deposited over the entire surface of the substrate 201 with the gate electrode 202a and the gate line 202 formed thereon, to form the gate insulation layer 213.

Subsequently, amorphous silicon and n$^+$ amorphous silicon doped with an impurity such as phosphor (p) are sequentially deposited on the gate insulation layer 213 and patterned to form the semiconductor layer 205a and the ohmic contact layer 205b.

Thereafter, a metal material such as Mo, MoW, MoTa, MoNb, Cr or W is deposited on the ohmic contact layer 205b and on the gate insulation layer 213 by sputtering and patterned to form the source/drain electrodes 204a and 204b having a certain interval therebetween on the semiconductor layer 205 and the storage electrode 204 overlapping with the gate line 202, thereby forming the thin film transistor 210 and the storage capacitor Cst.

Then, an inorganic material such as SiOx or SiNx or an organic material such as BCB or acryl is coated on the entire surface of the substrate 201 with the thin film transistor 210 and the capacitor Cst formed thereon, and patterned to form the passivation layer 215 disposed in a stripe form at the thin film transistor and along a short preventing region between the data line 204 and the pixel electrode 207.

The liquid crystal display device formed through the above-described process can be fabricated through the printing method as described above with reference to FIG. 3. Especially, rather than forming the few μm of contact hole, the passivation layer 215 is formed only at the short preventing region between the data line 204 and the pixel electrode 207 and at the thin film transistor, so that a defective pattern possibly generated during the printing method can be prevented.

In addition, because the drain electrode 204b and the storage electrode 206 directly contact with the pixel electrode 207 (that is, not through a contact hole) the contact resistance between the drain electrode and storage electrode can be reduced compared to the related art, and accordingly, a picture quality can be more improved.

Figure 6A:
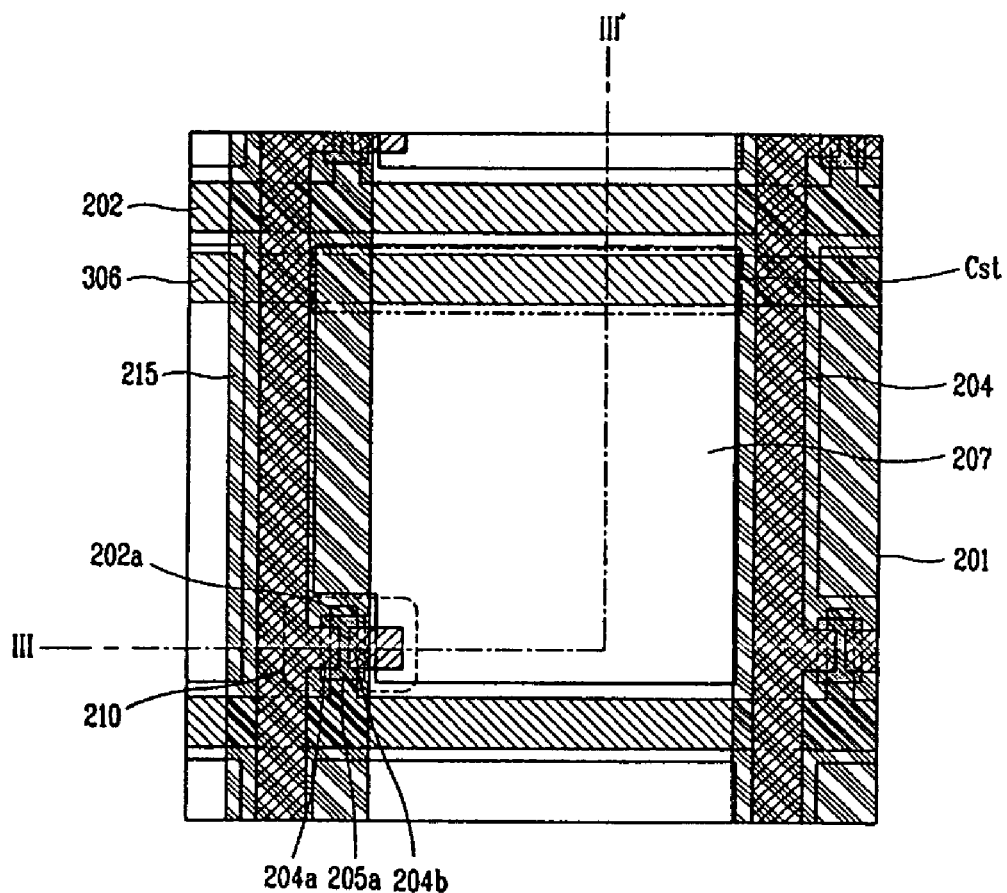
FIGS. 6A and 6B illustrate a liquid crystal display device in accordance with a second embodiment of the present invention.
Figure 6B:
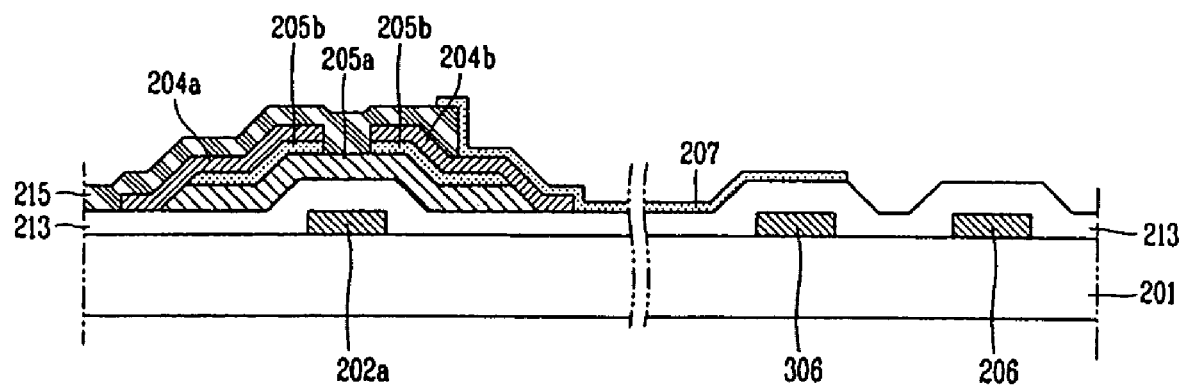
Figure 7A:
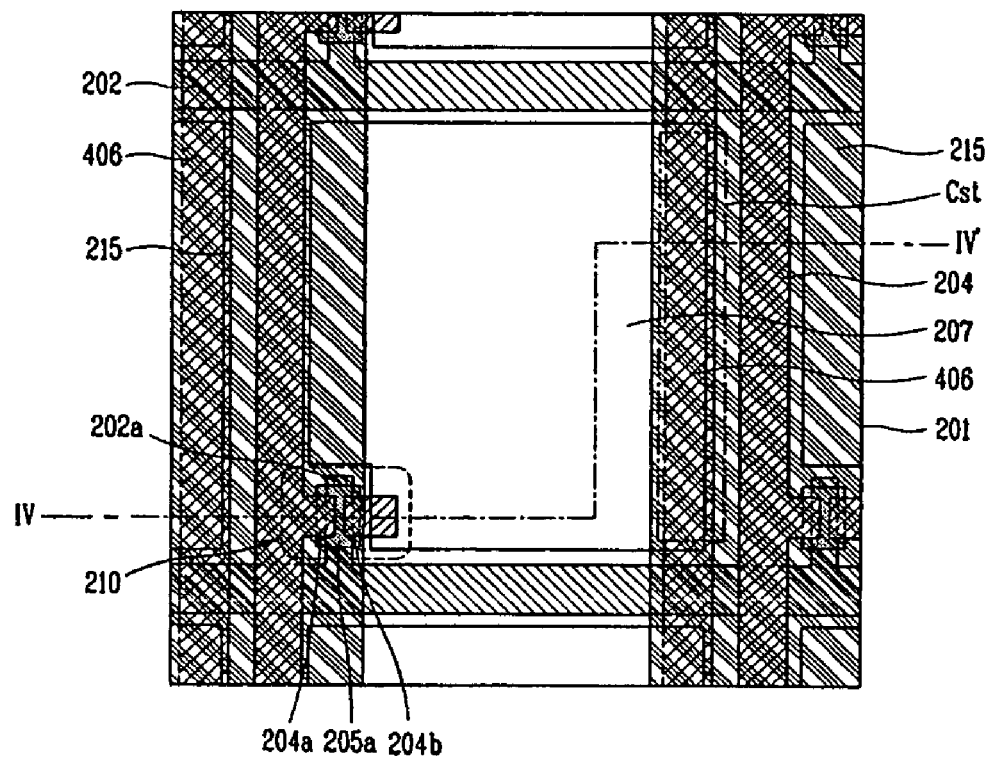
FIGS. 7A and 7B illustrate a liquid crystal display device in accordance with a third embodiment of the present invention.
Figure 7B:
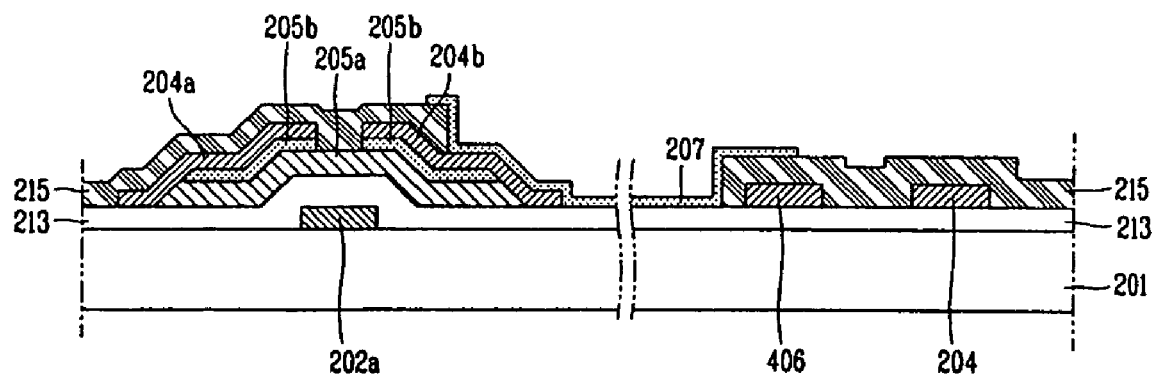

FIGS. 6A and 6B illustrate a liquid crystal display device in accordance with a second embodiment of the present invention; and FIGS. 7A and 7B illustrate a liquid crystal display device in accordance with a third of the present invention. FIGS. 6B and 7B illustrate sections taken along line III-III' and IV-IV' of FIGS. 6A and 7A.

With reference to FIGS. 6A, 6B and 7A and 7B, a storage line is prepared to form a storage capacitor, and except for the storage line, their constructions are the same as those of the former embodiment (FIG. 5). Thus, same reference numerals are given to the same elements and only their difference will now be described.

First, as illustrated in FIGS. 6A and 6B, a storage line 306 is formed substantially parallel to the gate line 202, on which the pixel electrode 207 is formed to form a storage capacitor Cst. As in the former embodiment, the storage capacitor Cst is formed by the storage line 306, which is substantially parallel to the gate line 202, the gate insulation layer 213 deposited thereon, and the pixel electrode 207 formed overlapping with the storage line 306. The storage line 306 is patterned and formed at the same time when the gate line 202 is formed.

Meanwhile, with reference to FIGS. 7A and 7B, a storage line 406 may be formed substantially parallel to the data line 204, on which the pixel electrode 207 is formed to contact directly therewith. In this case, a storage capacitor Cst is formed by the storage line 406 disposed parallel to the data line 204, the passivation layer 215 deposited thereon, and the pixel electrode 207 formed on the passivation layer 215 to overlap with the storage line 406. The storage line 406 is patterned and formed at the same time when the data line 204 is formed.

As illustrated in FIGS. 6A, 6B, 7A and 7B, the storage capacitor is formed by providing the storage line, so that a gate signal delay can be reduced compared to the former embodiment (FIG. 5).

In detail, the gate signal delay is caused due to the resistance of the gate line and the storage capacitor generated on the gate line. By moving the storage capacitor on the gate line to a different region, the gate signal delay can be reduced. In addition, because the drain electrode 204b and the storage lines 306 and 406 directly contact with the pixel electrode 207, their contact resistance can be reduced, and thus a picture quality can be more improved.

In addition to the photomasking process described above with respect to FIGS. 3A to 3C, the liquid crystal display devices illustrated in FIGS. 5A, 5B, 6A, 6B, 7A and 7B may also be fabricated using method of roll printing a passivation layer directly onto the substrate. Such process will be described with respect to FIGS. 8A to 8C.

Figure 8A:
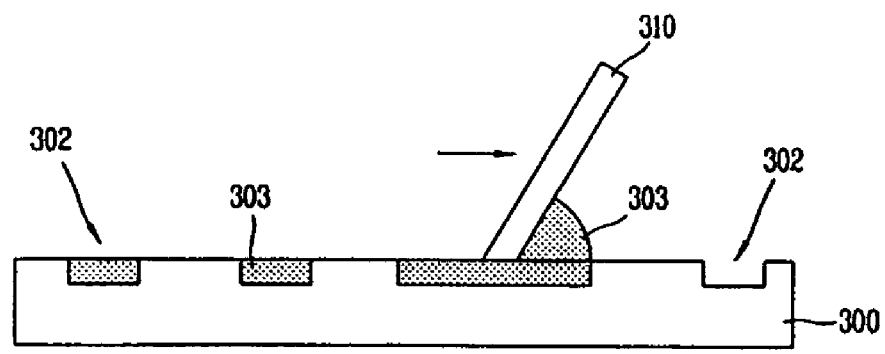
FIGS. 8A to 8C are views illustrating a method of forming a patterned insulation layer using a roll printing method according to the present invention.
Figure 8B:
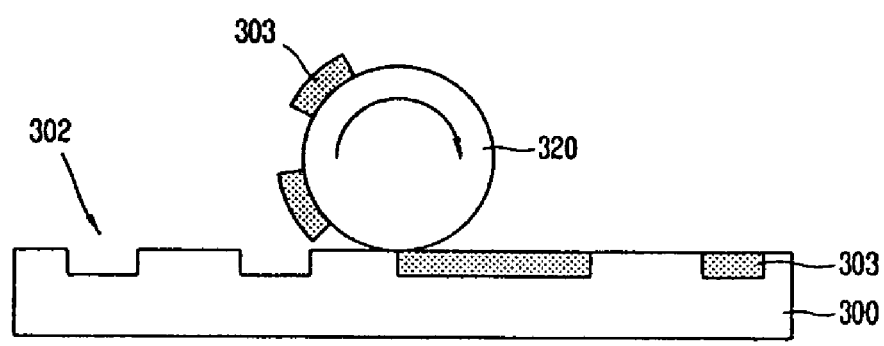
Figure 8C:
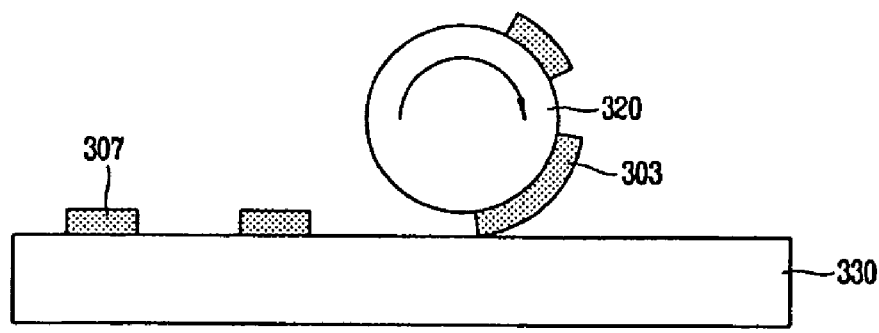

FIGS. 8A to 8C are views illustrating forming a passivation of a liquid crystal display device through a method of roll printing an organic material in accordance with the present invention.

With reference to FIG. 8A, a cliché 300 with a concave groove 302 formed at a position corresponding to a pattern desired to be formed on a substrate is prepared. An organic insulation material 303 is deposited on the surface of the substrate 300. A doctor blade 310 may be used to planarize the surface of the cliché 300, push the resist into the grooves 302 and remove the resist 303 from the surface of the cliché 300. Thus, the resist 303 is filled in the groove 302 while the resist remaining on the surface of the cliché 300 is removed.

As illustrated in FIG. 8B, the organic insulation material 303 filled in the groove 302 of the cliché 300 is transferred to a surface of the printing roll 320 that is rotated in contact with the surface of the cliché 300. The printing roll 310 is formed with the same width as a panel of a display device to be fabricated and has a circumference substantially the same as the length of the panel. Accordingly, the organic insulation material 303 filled in the groove 302 of the cliché 300 is transferred onto the printing roll 320.

Thereafter, as illustrated in FIG. 8C, to transfer the organic insulation material 303 on the printing roll 320 to the surface of a substrate 330 already having components (not shown) such as data lines, gate lines and thin film transistors formed thereon, the printing roll 320 is rotated in close proximity or in contact with the substrate 330. Thus, the organic insulation material 303 transferred on the printing roll 320 is applied to the substrate 330. Accordingly, at this time, a passivation layer having a desired pattern 307 can be formed over the entire substrate 331 by rotating the printing roll 320 once over the surface of the substrate 330.

The above-described printing method is advantageous in that the passivation layer pattern 307 can be generated through a one time process and a photomasking process is not required to provide a patterned passivation layer 307. Thus, at least one photomasking process step can be eliminated during manufacturing of the liquid crystal display device.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first and second substrates facing each other;
   a gate line and a data line arranged substantially perpendicular to one another on the first substrate and defining a pixel region;
   a thin film transistor at crossing of the gate line and the data line;
   a storage electrode on the gate line;
   a passivation film interposed between the thin film transistor and pixel electrode, the passivation film including a passivation film stripe formed on and along the data line, the passivation film stripe being disposed on a portion of a drain electrode of the thin film transistor to expose the upper surface of the storage electrode and other portion of the drain electrode and the pixel region, the exposed other portion of the drain electrode and the exposed pixel region are continuously exposed;
   a pixel electrode in the continuously exposed area of the pixel region and the drain electrode and the upper surface of the storage electrode, the pixel electrode being directly in contact with the upper surface of the drain electrode and the whole area of the storage electrode where the passivation film is not disposed; and
   liquid crystal interposed between the first and second substrates.

2. The device of claim 1, wherein the thin film transistor comprises: a gate electrode;
   a semiconductor layer on the gate electrode; and source/drain electrodes on the semiconductor layer.

3. The device of claim 1, further comprising:
   a gate insulation layer formed between the gate line and the data line.

4. A method for fabricating a liquid crystal display device, comprising:
   providing a first substrate;
   forming a gate electrode and a gate line on the substrate;
   forming a semiconductor layer pattern on the gate electrode;

forming source/drain electrode and a data line substantially perpendicular to the gate line and crossing to define a pixel region;

forming a passivation film on the substrate having the thin film transistor, the passivation film including a passivation film stripe formed on and along the data line, the passivation film stripe being disposed on a portion of a drain electrode of the thin film transistor to expose the upper surface of the storage electrode and other portion of the drain electrode and the pixel region, the exposed other portion of the drain electrode and the exposed pixel region are continuously exposed; and forming a pixel electrode in the continuous exposed area of the pixel region and the drain electrode and the upper surface of the storage electrode, the pixel electrode being directly in contact with the upper surface of the drain electrode and the whole area of the storage electrode where the passivation film is not disposed;

providing anther substrate facing the first substrate; and providing liquid crystal between the first and second substrate.

* * * * *